[19] United States Patent
Rousseau

[11] 3,911,979
[45] Oct. 14, 1975

[54] DEVICE FOR CUTTING DOWN TREE STEMS

[76] Inventor: Joseph Rousseau, 40-44 Avenue Wissel, 69250 Neuville-sur-Saone, France

[22] Filed: May 13, 1974

[21] Appl. No.: 469,538

[30] Foreign Application Priority Data
May 22, 1973 France .............................. 73.19580

[52] U.S. Cl.................. 144/2 N; 37/92; 37/189; 144/34 R; 144/236; 241/101.7; 241/278
[51] Int. Cl.² ...................... B02C 1/04; A01G 23/08
[58] Field of Search.......... 144/34 R, 2 N, 118, 231, 144/232, 233, 234, 235, 236, 176; 241/101.7, 188 R, 188 A, 244, 250, 251, 252, 278; 37/91, 92, 189

[56] References Cited
UNITED STATES PATENTS

| 1,321,044 | 11/1919 | Hurd | 144/2 N |
| 1,485,527 | 3/1924 | Raeber | 144/2 N |
| 1,554,424 | 9/1925 | Dungan | 144/2 N |
| 2,887,134 | 5/1959 | Bartlett | 144/2 N |
| 3,041,750 | 7/1962 | Garnand | 37/92 |
| 3,168,785 | 2/1965 | Davis | 37/92 |
| 3,746,062 | 7/1973 | Nystrom et al. | 144/176 |
| 3,750,758 | 8/1973 | Bancel | 37/92 X |

FOREIGN PATENTS OR APPLICATIONS
892,372  7/1949  Germany ............................ 144/118

Primary Examiner—Donald R. Schran
Assistant Examiner—W. D. Bray
Attorney, Agent, or Firm—Bacon & Thomas

[57] ABSTRACT

A device for cutting down tree stems. It has a wheeled frame defining a central aperture into which a chassis is mounted for oscillating movement, at one end, about an axis transverse to the frame, a pair of hydraulic jacks at the other end of the frame being connected to the chassis to oscillate it. A carrier is mounted on the chassis to be moved reciprocally longitudinally on riding tracks provided alongside the chassis, the carrier being displaceable by means of hydraulic jacks. The said carrier has a pair of rotary disks extending beneath the chassis and rotatable in opposite directions about parallel axes extending longitudinally of the chassis. These disks have forwardly projecting cutters whereby they may be set behind a stump and brought into rotation, and said carrier may be moved forwardly toward and into the stump to nibble at it and cut it down.

14 Claims, 8 Drawing Figures

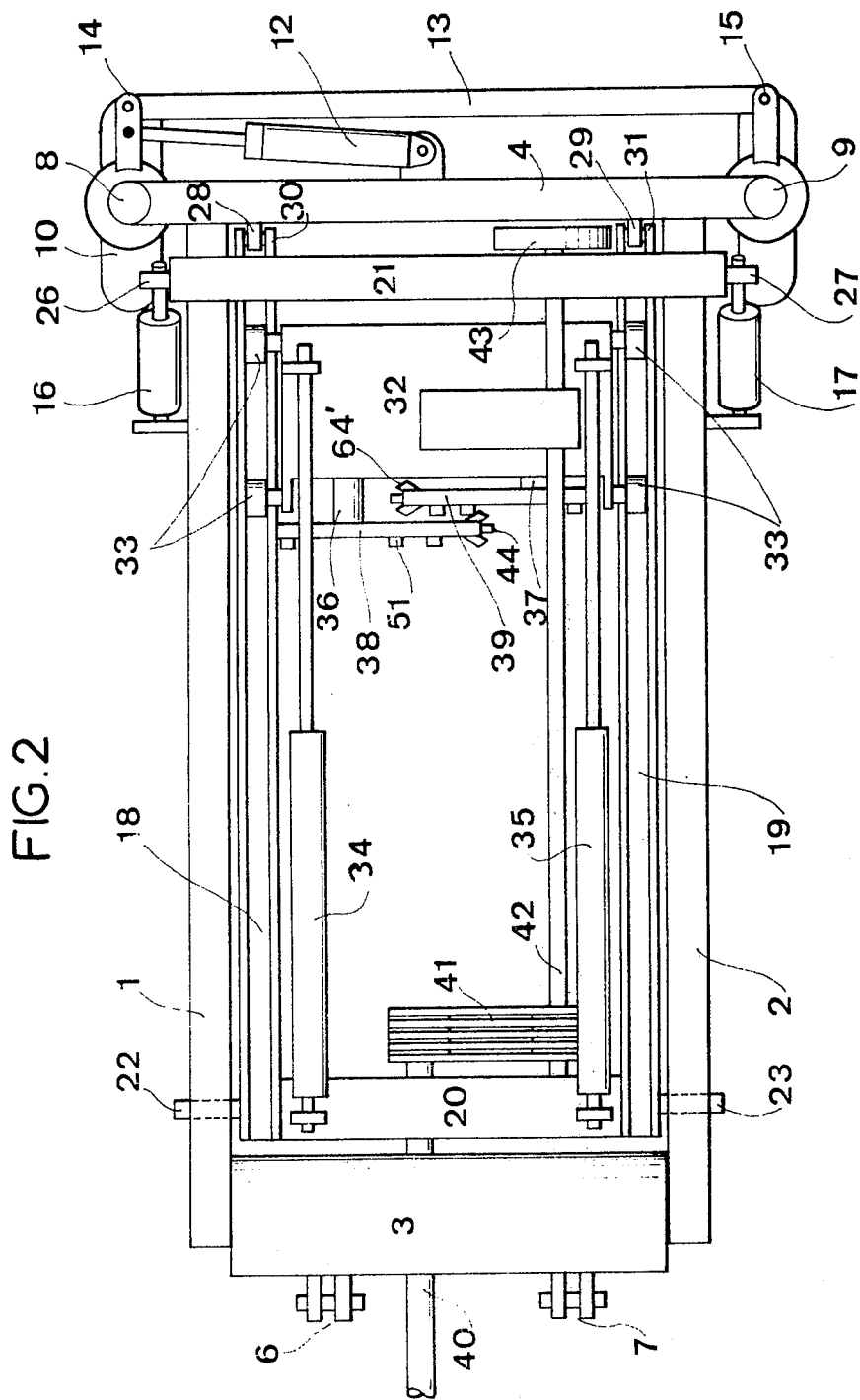

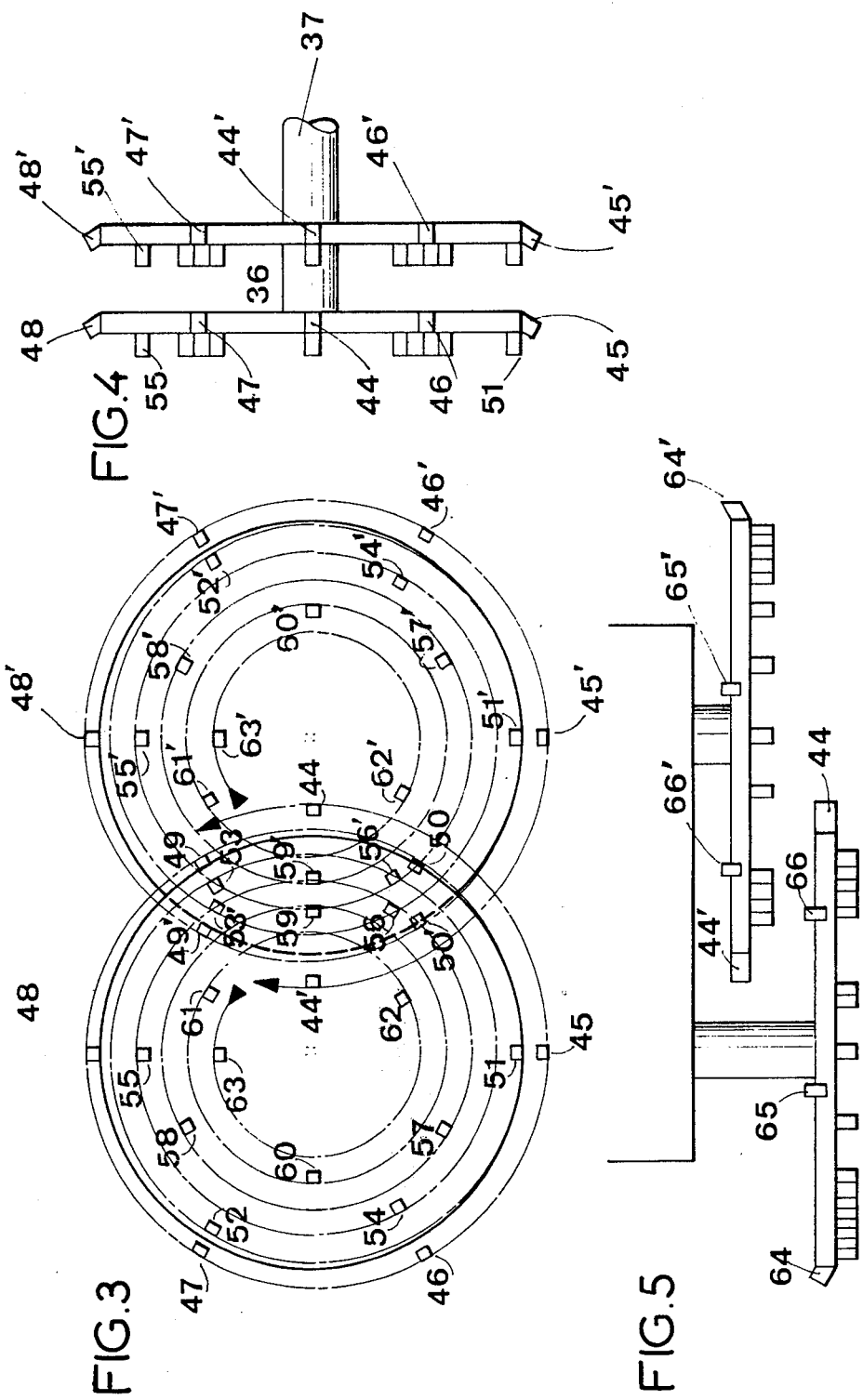

DEVICE FOR CUTTING DOWN TREE STEMS

The present invention relates to a device for deeply cutting down tree stumps whatever be their diameter and hardness with a maximum of efficiency, speed and safety.

The devices presently in use are difficult to handle, are not appropriate for certain types of lands and are sometimes dangerous because they throw wood fragments forceably and in great amounts.

The present invention avoids the aforesaid disadvantages by providing a device comprising a wheeled frame defining a central aperture into which a chassis is mounted for oscillating movement, at one end, about an axis transverse to the frame, the chassis having a pair of longitudinally extending riding tracks. The device also includes a carrier mounted on a chassis to be moved reciprocally longitudinally on the riding tracks and having a pair of rotary disks extending beneath the chassis and being rotatable in opposite directions about parallel axes extending longitudinally of the chassis. The rotary disks are provided with forwardly projecting cutters whereby they may be set behind a stump so that when the carrier is moved forwardly toward and into the stump, the cutters nibble it and cut it down.

The cutters may be removable and disposed on the forward faces, along the periphery and along the edges of the disks with the cutters disposed on the forward faces being arranged along respective lines of the disks defining oppositely directed spirals and with the cutters along the edges being spaced from one another and angularly disposed for frontal cutting of the stump. These disks may be mounted on parallel rotary shafts spaced a predetermined distance apart to allow the disks to overlap partially.

The frame may be wheeled by a pair of pivotable rear wheels to control its direction of movement, such wheels being mounted on supports interconnected by a coupling bar arrangement for synchronized movement of the wheels, a power jack interconnecting the frame and the coupling bar arrangement to control the said direction of movement.

A specific embodiment of the invention will now be described with reference to the appended drawings wherein:

FIG. 2 is a plan view of the device;

FIGS. 3, 4 and 5 are, respectively, a front view, a side view and a top view of the cutter assembly of the device.

Figure 1:
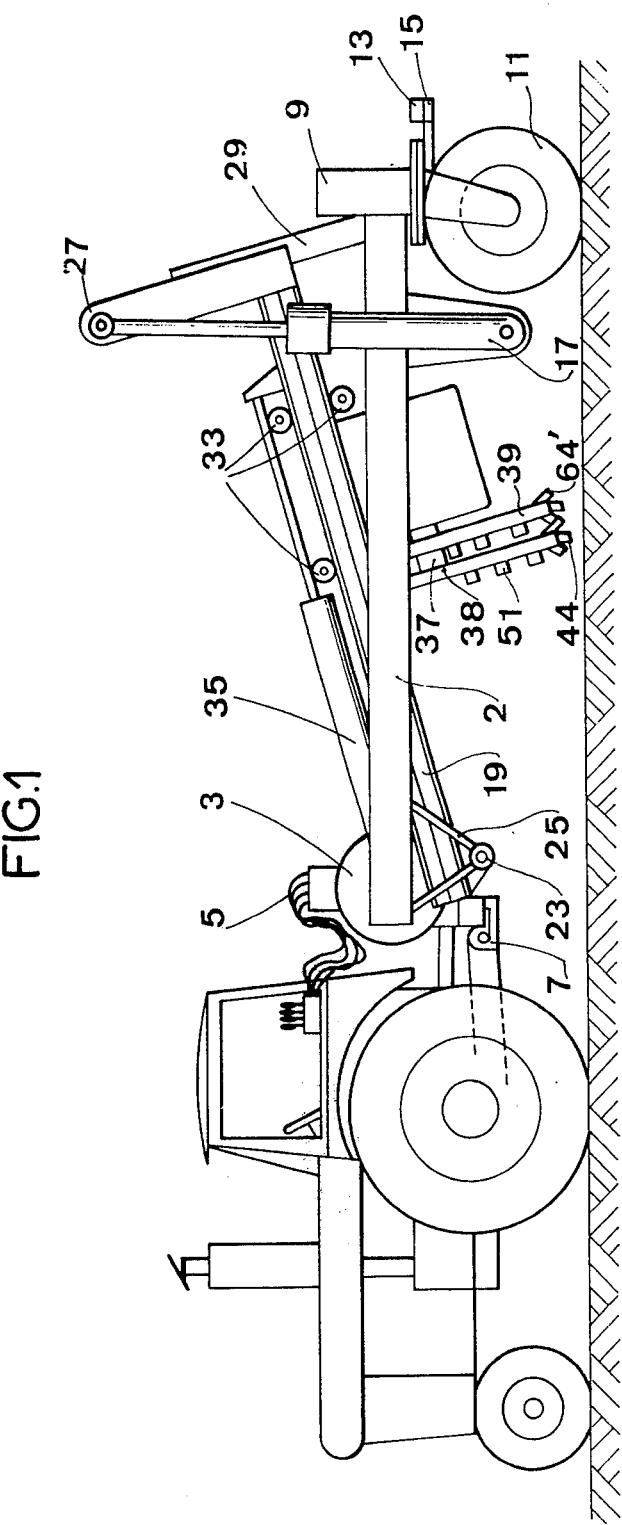
FIG. 1 is a side elevation view of a device according to the invention hooked onto a tractor.

Referring now to FIGS. 1 and 2, a frame is shown made up of two side beams 1 and 2 connected at the front by a transverse member 3 and at the rear by a transverse member 4 thus defining a rigid metallic frame.

The side beams 1 and 2 support, by means of welded gusset plates near their ends, two double-acting jacks 16 and 17 controlling the oscillating motion of a cutter assembly supporting chassis to be referred to hereinafter.

The forward transverse member 3 forms a cylinder which serves as a tank for the oil feeding the jacks, this tank being connected by means of flexible hoses 5 to a hydraulic control system of the tractor. This transverse member carries forks and pins 6 and 7 for hooking-up the frame to the tractor.

The rear transverse member 4 supports, on the one hand, rotation axles 8 and 9 of wheels 10 and 11 with which the frame is provided and, on the other hand, a double-action jack 12 for controlling a coupling bar 13 pivoted at each of its ends to forks 14 and 15 solid with the pivotal movement of the wheels and, finally, two plates 28-29 for guiding the oscillation of the chassis supporting the cutter assembly, or mobile chassis. The latter is constituted by two side members 18 and 19 defining rolling tracks and joined by a front transverse member 20 and a rear transverse member 21.

The front transverse member 20 comprises two bosses supporting axles 22 and 23 which are journalled into two supports 24 and 25 of the side beams 1 and 2 of the stationary frame, allowing the mobile chassis to oscillate vertically, the oscillation being controlled by the jacks 16 and 17 of which the head is articulated on an axle carried by vertical risers 26-27 extending at right angles to the ends of the rear transverse member 21 which is provided with two forks 30-31 into which the guiding plates 28-29 slide to guide the oscillation of the chassis.

The cutter assembly comprises a gear case 32 mounted on rollers 33 riding on and beneath the side members 18 and 19 which act as rolling tracks.

Solidly connected to the gear case 32, are the heads of two long double-action jacks 34 and 35 laterally disposed inwardly of the side members 18 and 19. These jacks provide the reciprocating motion of the gear-case 32 during the planning operations.

This gear case is also the holder of housing into which a gearing arrangement transmits power to shafts 36-37 carrying disks 38 and 39 to move them with sufficient torque into the necessary rotation to do the work, the power being provided by a take-off 40 of the tractor, through transmission belts 41 and a driving shaft 42, whereas a fly-wheel 43 ensures absorption of shocks.

FIGS. 3, 4 and 5 diagrammatically illustrate the two disks 38 and 39 and their relative position as well as the location of the cutters.

Cutters 44 to 50 and 44' to 50', arranged on the edge of the disks and bent forwardly, are intended for the external front cut. Their biting angle is perfectly defined in FIG. 4.

The cutters 51 to 63 and 51' to 63' are those secured on the forward face of the disks, called the working face.

FIG. 3 shows an imaginary spiral line along which the cutters are secured and, also, the direction of rotation of the disks. These lines form, starting at the periphery, two pitches of opposite direction. The disks 38-39 are secured on their shaft in such a way that the tools 51 and 51', 52 and 52' etc. .... coincide during rotation of the disks in order to avoid jarring and to obtain an optimum efficiency.

Referring again to FIG. 3, partial overlapping will be noted on a short distance which determines a maximum working surface for the device.

FIG. 5 illustrates cutters 64, 65, 66 and 64', 65', 66' located on the rear periphery of the disks and adapted for cleaning up during return motion of the disks.

Figure 6:
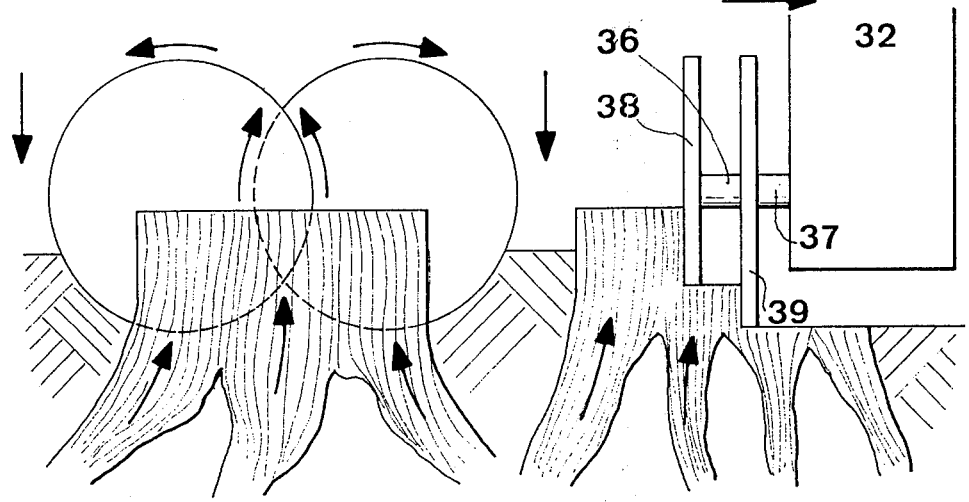
FIGS. 6, 7 and 8 are, respectively, a front view, a side view and a top view diagrammatically showing the cutter assembly in operation.
Figure 7:
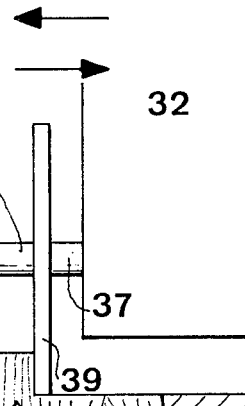
Figure 8:
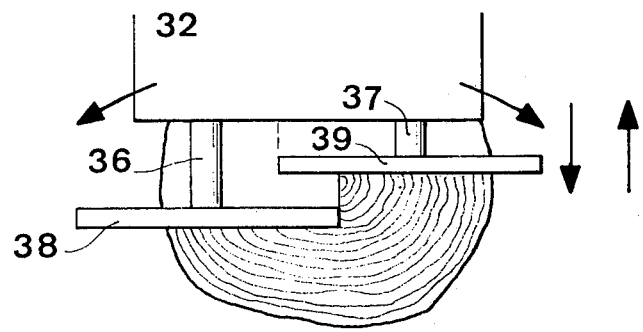

FIGS. 6, 7 and 8 illustrate the nibbling operation of a stump which is carried out as follows. With the device suitably located on the lot, a maneuver which is easy because the rear wheels of the device can swivel, the disks are brought in contact with the stump to be cut down (FIG. 6); the work is started, the rotation of the disks causes nibbling and the cutters penetrate the wood. The speed of the cut is calculated so as to avoid that the cutters wear out too rapidly but is sufficient to provide a worthwhile result. The direction of rotation of the disks draws the machine toward the ground and holds it steady. There is no vibrations and consequently it is not necessary to provide any sort of stabilization.

The force is less important due to the fact that the wood is cut with the grain and is reduced into chips which are rapidly changed into vegetable mould.

The cutter assembly has a longitudinal movement transmitted by the jacks 34 and 35. Consequently, the jacks at first pull the cutter assembly forwardly for a first cut, then release and push the set of disks back rearwardly while cleaning up the chips due to the cutters secured along the rear periphery of the said disks and thereafter start a second cut at a lower level and so on until the required depth is reached. Lateral displacement of the disks is obtained through lateral displacement of the frame, the latter being obtainable by swivelling the rear wheels.

The device of the invention can work on all types of terrains, even if rocky and in liquids. It may used for digging trenches.

The device of the invention can be half-carried by a tractor as in the embodiment described above. It may also be self-controlled, self-propelled and have an auxiliary thermal engine or a hydrostatic transmission.

The device may also comprise four disks, two at the front and two at the rear, which would make it possible to use it in both directions.

I claim:
1. A device for cutting out tree stumps comprising:
   a. a frame
   b. a chassis mounted within said frame
   c. a carrier mounted on said chassis
   d. a pair of discs mounted on said carrier and rotatable in opposite directions; and
   e. forwardly projecting cutters distributed on each disc along a single line, each line respectively defining a spiral the lines for each disc, starting at the periphery, forming two pitches of opposite direction and complimentary disposition; the cutters on each disc being symmetrically disposed so as to converge during rotation of the discs thereby being capable of simultaneously cutting into the stump, the directions of rotation of the discs drawing the machine toward the ground.

2. A device as claimed in claim 1 wherein said forwardly projecting cutters are disposed on the forward faces, along the peripheries and along the edges of said discs.

3. A device as claimed in claim 2, wherein said cutters disposed along the edges of said discs are spaced from one another and angularly disposed for frontal cutting.

4. A device as claimed in claim 1, wherein said discs are brought into rotation by a transmission means adapted to be coupled to a power take-off of a drawing vehicle.

5. A device as claimed in claim 1, wherein said carrier includes parallel rotary shafts on which said discs are rigidly mounted so that the respective cutters are symmetrically placed to be capable of penetrating into said stump simultaneously.

6. A device as claimed in claim 5, wherein said shafts are spaced apart a distance such that said discs partially overlap and are fixed on said shafts to be spaced apart a distance sufficient to free the respective cutters for rotation.

7. A device as claimed in claim 1, wherein:
   said frame is a wheeled frame defining a central aperture and having a front and rear end;
   said chassis is mounted at one end on said frame within said aperture and is capable of substantially vertical movement pivotal about an axis transverse to said frame and means to pivot said chassis about said axis, said chassis having a pair of longitudinally extending riding tracks;
   said carrier is mounted on said chassis and is capable of reciprocal longitudinal movement on said riding tracks and means to move said carrier along said riding tracks; and
   said pair of discs, extend beneath said chassis, and rotate about parallel axes extending longitudinally of said chassis;
   whereby said discs may be set behind a stump and brought into rotation, and said carrier may be moved forwardly toward and into said stump to nibble at it and cut it out.

8. A device as claimed in claim 7, wherein said means moving said carrier on said riding tracks are power jacks, one end of which is mounted on said carrier and the other end of which is mounted on the forward end of said chassis.

9. A device as claimed in claim 8, wherein said power jacks are hydraulically actuated and said frame has a front transverse member in the form of a cylinder to contain hydraulic fluid for the actuation of the said power jack.

10. A device as claimed in claim 7, wherein said means pivoting said chassis are double-acting power jacks each fixed at one end to said frame and at the other end to the rear end of said chassis and means, at the rear ends of said frame and chassis, to guide the vertical movement of the chassis.

11. A device as claimed in claim 10 wherein said power jacks are hydraulically actuated and said frame has a front transverse member in the form of a cylinder to contain hydraulic fluid for the actuation of the said power jack.

12. A device as claimed in claim 7, wherein said wheeled frame has a pair of pivotable rear wheels to control its direction of movement and means at the forward end for hook-up to a drawing vehicle.

13. A device as claimed in claim 12, including coupling bar means joining said rear wheels for synchronized pivoting movement and a power jack interconnecting said frame and coupling bar means to control the direction of movement of said frame.

14. A device as claimed in claim 13, wherein said power jack is hydraulically actuated and said frame has a front transverse member in the form of a cylinder to contain hydraulic fluid for the actuation of the said power jack.

* * * * *